United States Patent
Murray-Laursen

(10) Patent No.: US 9,241,506 B2
(45) Date of Patent: Jan. 26, 2016

(54) DECORATED PASTA PRODUCT AND METHOD OF MAKING THE SAME

(71) Applicant: Shawn M. Murray-Laursen, Fenton, MI (US)

(72) Inventor: Shawn M. Murray-Laursen, Fenton, MI (US)

(*) Notice: Subject to any disclaimer, the term of this patent is extended or adjusted under 35 U.S.C. 154(b) by 0 days.

(21) Appl. No.: 14/185,891

(22) Filed: Feb. 20, 2014

(65) Prior Publication Data

US 2015/0230504 A1     Aug. 20, 2015

(51) Int. Cl.
    *A23L 1/16*     (2006.01)
    *A23L 1/275*     (2006.01)
    *A21D 2/00*     (2006.01)

(52) U.S. Cl.
    CPC ... *A23L 1/16* (2013.01); *A21D 2/00* (2013.01); *A23L 1/275* (2013.01); *A23L 1/1613* (2013.01)

(58) Field of Classification Search
    CPC .. A23L 1/1645; A21D 13/0022; A23D 9/013; A23G 3/28; A21B 5/02
    USPC ......... 426/531, 549, 556, 560, 665, 383, 391, 426/442, 626, 87, 250, 254, 540, 251, 252
    See application file for complete search history.

(56) References Cited

U.S. PATENT DOCUMENTS

| | | | | |
|---|---|---|---|---|
| 6,001,405 | A * | 12/1999 | Bajracharya et al. | 426/325 |
| 7,884,953 | B1 * | 2/2011 | Willcocks | A23G 3/0097 358/1.1 |
| 2004/0101615 | A1 | 5/2004 | Barker et al. | |
| 2006/0228451 | A1 * | 10/2006 | Martin | 426/383 |
| 2007/0231435 | A1 * | 10/2007 | Ream et al. | 426/383 |
| 2007/0275129 | A1 * | 11/2007 | Pershad | A23G 3/343 426/104 |
| 2011/0250252 | A1 * | 10/2011 | Canham | A23L 1/0305 424/401 |

FOREIGN PATENT DOCUMENTS

EP     1 413 207     4/2008
WO     2007/115050 A2     10/2007

OTHER PUBLICATIONS

The Novice Gardener, Having Fun with Homemade Pasta, Apr. 9, 2014, http://thenovicegardener.wordpress.com/2014/04/09/having-fun-with-homemade-pasta/ (accessed Sep. 8, 2014).*
Written Opinion of the Intentional Searching Authority in related application PCT/US2015/016645 dated Aug. 20, 2015.

* cited by examiner

*Primary Examiner* — Drew Becker
*Assistant Examiner* — Bryan Kim
(74) *Attorney, Agent, or Firm* — Young Basile Hanlon & MacFarlane P.C.

(57) ABSTRACT

A pasta product that includes a central body, the central body having a central region and at least one planar face, the planar face having an outwardly oriented face and a surface region oriented between the central region and the outwardly oriented face, the central body having a first color, the planar face defining a display field and at least one first indicia contained in the outwardly oriented face and extending into the surface region of the central body, the indicia having at least one second color that differs from the first color, wherein the first indicia composes between 2% and 98% of the display field defined in the outwardly oriented face.

10 Claims, 4 Drawing Sheets

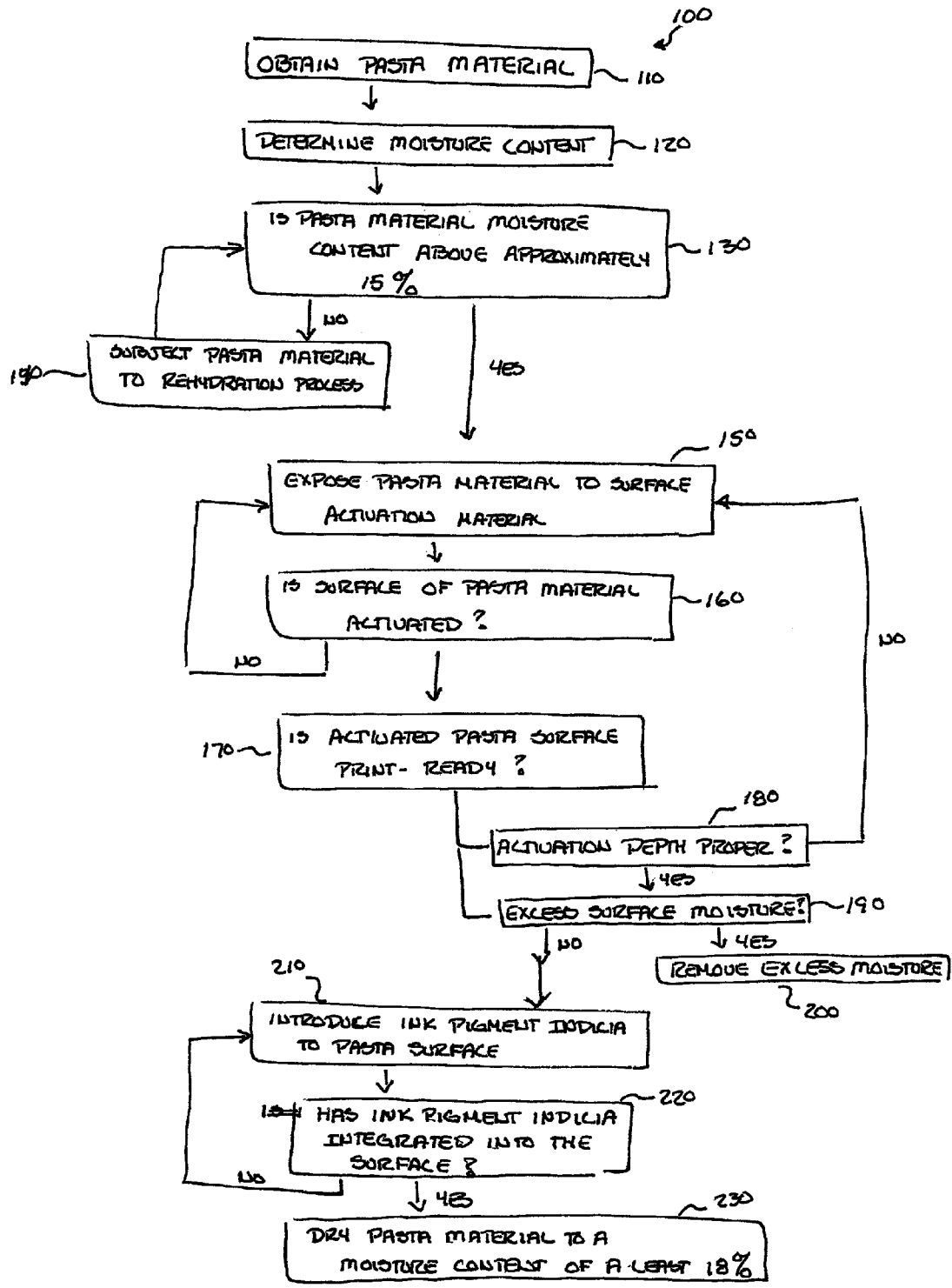

DECORATED PASTA PRODUCT AND METHOD OF MAKING THE SAME

BACKGROUND

This invention pertains to pasta products and methods for making the same. More particularly, this invention is directed to decorated pasta and methods of making the same.

Indices and various decorative elements have been employed on different types of food products. Heretofore, successful use of decorative elements has been limited to materials having a high sugar content such as sugar-coated materials, sugar-iced products and the like. The use of decorative elements and indicia has been more limited on other food products. It has also been difficult to impart printed indicia and decorative elements on food products that lack the high sugar content found in materials such as sugar-iced products. It has also been difficult to impart permanent printing, decorations and indicia on food material that requires subsequent cooking or processing steps. This is particularly problematic for high starch materials such as noodles, pasta and the like.

Thus it would be desirable to provide a pasta material that can be decorated in one or more colors, with discrete indicia if desired, that is essentially stable during the cooking process. It would also be desirable to provide a method for imparting a design on a food product such as pasta.

SUMMARY

A pasta product having at least one indicia composed of food grade pigment imparted on a portion of at least one surface region such that the indicia is stable during storage and/or cooking is disclosed herein. Also disclosed is a method for producing a pasta product with at least one discrete indicia imparted into a portion of the pasta surface that comprises the step of exposing the surface of the pasta product to an acidified aqueous solution for an interval an interval suitable to form a reactive surface on the pasta product; and after the exposing step, drying the treated pasta surface to produce a dye-receiving surface and imparting food grade dye material to a discrete region of the dye-receiving surface.

BRIEF DESCRIPTION OF THE DRAWINGS

The various features, advantages and other uses of the present apparatus will become more apparent by referring to the following detailed description and drawing in which:

FIG. 6 is a process diagram of one embodiment of the method disclosed herein.

DETAILED DESCRIPTION

Disclosed herein is a pasta product and making the same. As broadly construed, the pasta product disclosed herein includes a pasta piece having at least one elongated flat surface. The elongated flat surface has at least one indicia permanently imprinted thereon. Also disclosed is a method for making decorated pasta having at least one indicia imprinted thereon.

Figure 1:
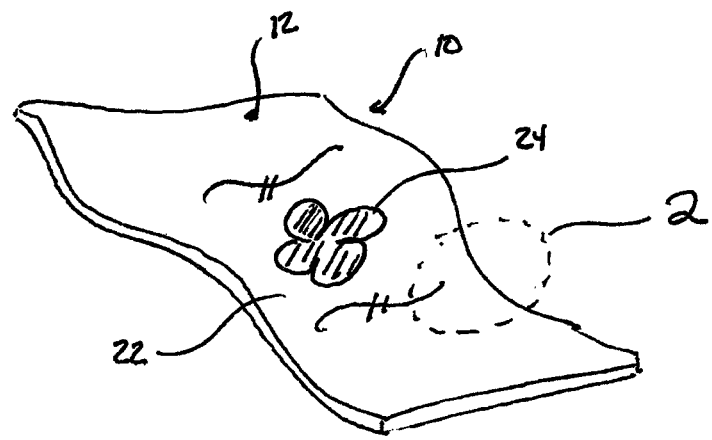
FIG. 1 is perspective view of an embodiment of a pasta product as disclosed herein.

An embodiment of the pasta product as disclosed herein is depicted in FIG. 1. The pasta product 10 can be composed of any suitable pasta material. Various pasta compositions are considered within the purview of this disclosure. As broadly construed, pasta as disclosed herein can be defined as a noodle product made from unleavened dough and is composed of water and flour, primarily. As desired or required, the pasta material of choice can also include various materials such as eggs, oil and the like.

The flour material can be derived from various grain materials including, but not limited to, wheat flour such as durum, semolina and the like. It is also possible to employ other types of flour material in the pasta material. Non-limiting examples include material derived from other cereals and grains including but not limited to maize, corn, rice, barley, etc. The pasta materials can include other ingredients as desired or required. The grain materials can be supplemented with starch material derived from other sources, for example potatoes and the like.

In addition to the optional egg material discussed above, pasta products can also include additives such as liquid materials such as milk or cream, food oils and the like. It is also within the purview of this disclosure that the pasta product can include materials such as wine, ink from seafood such as octopus, squid or cuttlefish. The pasta material can also include various vegetable purees from materials such as tomato, mushrooms, cheeses, herbs and spices as well as other seasonings. It is to be understood that various additives can impart various essentially uniform coloration to the base pasta product.

The pasta product 10 can be either a fresh or dried material. In various fresh pasta products, the base pasta can be made with a mixture of eggs and all-purpose or "00" high gluten flour. In various situations, dried pasta can include flour such as semolina and water with optional material such as eggs and the like. Fresh pasta typically has higher moisture content, while in dried pasta, the moisture is removed over a protracted period. In the United States, suitable pasta products may be classified variously as macaroni products, enriched macaroni products (with or without protein fortification), milk macaroni products, vegetable macaroni products, etc. Suitable pasta products can also be classified as noodle products, enriched noodle products, vegetable noodle products, enriched vegetable noodle products as well as wheat and soy products.

The pasta product 10 as disclosed herein can have various configurations. The pasta material can be in the form of a long noodle such as ribbon cut noodle, extruded noodles and the like. Non-limiting examples of suitable noodles include materials such as fettuccine, lagane, lasagna, linguini, papardelle, shahe fen, biang biang noodles and the like. It is also possible to employ short-cut extruded pasta. Non-limiting examples of such short-cut pastas include garganelle, farfalle and the like. Where desired or required, the pasta material can be a stuffed material such as ravioli, tortellini and the like with an embodiment of such stuffed material being depicted in FIG. 3.

Figure 2:
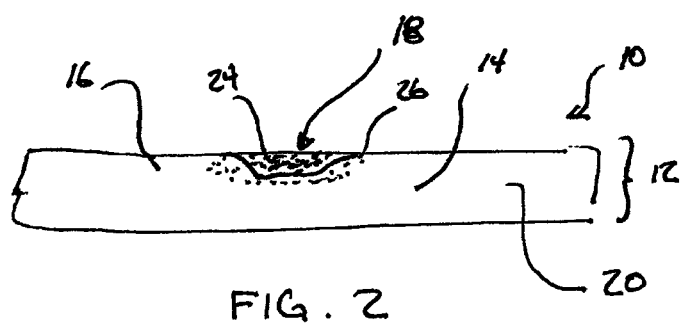
FIG. 2 is a cross sectional view of the pasta product of FIG. 1.

In general, the pasta product 10 as disclosed herein and depicted in FIGS. 1 and 2 will have a central body 12 that includes at least one central region 14 and at least one display face 16. The display face 16 has an outwardly oriented surface 18 and an intermediate region 20 that is oriented between the central region 14 and the outwardly oriented surface 18.

The central body 12 will typically have a first color. In various embodiments, it is contemplated that the central body can have a natural color of white or beige such as that derived from the flour ingredients used in pasta manufacturing. It is also contemplated that the central body can be colored by the addition of pigmenting agents including, but not limited to, the vegetable purées and the like mentioned previously. In certain embodiments, the pasta product may be bi-color, tri-color, etc. It is contemplated that such multi-coloration will be the result of various manufacturing processes and will be generally homogeneously distributed throughout the specific region. Where the central region is bi-colored, tri-colored or the like, it is contemplated that in various embodiments, the coloration will be in the form of either longitudinal or latitudinal stripes.

In the embodiment as depicted in the drawing figures, the display face 16 can be planar and is configured to define a display field 22. The display field 22 can have any suitable outer boundary configuration. In the embodiment depicted the display field 22 is roughly rectangular in shape. Other configurations for the display field are considered within the purview of this invention. The display field 22 of the finished pasta product 10 can be either planar or irregular depending upon factors such as the type of pasta, manner of manufacture and the like.

The pasta product 10 has at least one first indicia 24 imparted on and contained within the pasta material of the portion of the outwardly oriented surface 18 that is associated with the display face 16. The at least one first indicia 24 is generally contained in the outwardly oriented surface 18 and extends into the intermediate region 20 of the central body 12.

The indicia such as the first indicia 24 is composed of a food grade dye or pigment material of a second color that differs from the first color of the central body 12. The second color employed in the indicia can be of any suitable hue. The term "differs", as employed herein, is taken to mean that the perceived hue of the first indicia 24 has sufficient contrast to be visible to the viewer at least temporarily. It is contemplated that the food grade dye or pigment material can be one that is permanently visible. It is also within the purview of this disclosure that the food grade material be one that is activated by an external environmental factor such as exposure to heat, water or the like to become visible.

The first indicia pigment material is discretely contained in the specified regions on the outwardly oriented surface 18 of the display field 22. The first indicia pigment material is present on the pasta surface in a manner that, when the first indicia 24 is viewed from the top of the piece of pasta product 10, a distinct demarcation between the indicia area containing the first indicia pigment area and the surrounding pasta material is present. By "distinct demarcation" as the term is used herein, it is meant that the indicia imprinting region is characterized by a region of maximum pigment density or saturation and a surrounded by a region of lesser pigment density or saturation around the edges or fringes of the surface area of the first indicia 24 which is referred to as the first indicia area 26. This less dense region is referred to as the half scale region. In the pasta product 10 as disclosed herein, the half scale region is between 0.25 and 5% of the surface area of the first indicia area 26. Without being bound to any theory, it is believed that the extreme thinness of the half-scale region in proportion to the surface area of the first indicia 24 is due to an unexpected lack of pigment bleed into pasta area that surrounds the area of indicia application.

In the pasta product 10 as disclosed herein, the first indicia pigment penetrates into the material of the central body 12 a spaced distance from the outer surface. In the embodiment disclosed, the first indicia pigment extends into the intermediate region 20 and bonds or adheres to the proximate pasta material in an essentially permanent manner. Depending on the thickness of the pasta product 10, the pasta product 10 may have a central region 14. The pasta material in the central region 14 will be composed of pasta material that has binding characteristics lower than the material in the intermediate region 20. The pasta material in the central region 14 may have a greater density and/or repellence that prevent significant penetration of the first indicia pigment therethrough.

The food grade dye material that is employed in the first indicia 24 penetrates the outwardly oriented surface 18 and extends into at least the intermediate region 20 of the central body 12 as can be seen in the cross section depicted in FIG. 2. In most embodiments of the pasta product disclosed herein, dye penetration is blocked or, at minimum, impeded by the pasta material present in the central region 14. Depending on the thickness of the central region 14, the first indicia 24 may be invisible when the pasta product 10 is viewed from a second face 29 opposed to the display face 16. In such situations, it is contemplated that the pasta product can include an opposed indicia 28 on the opposed or second face 29, for example as illustrated in FIG. 5.

Indicia such as first indicia 24 can encompass between about 2% and about 98% of the display field 22. In various embodiments such as the one depicted in FIG. 1, the pasta product 10 is a generally elongated flat planar element having two opposed surfaces 30, 32. It is within the purview of this disclosure to have a pasta product 10 of other suitable geometric shapes including but not limited to corkscrews, folds, stacks, undulations and the like. Examples of folded and/or stacked pasta products include tortellini, ravioli and the like with an embodiment of such stuffed pasta being depicted in FIG. 3.

The pigment or dye material that makes up first indicia 24 can be applied to the pasta product 10 by any means that will achieve integration of at least a portion of the dye material in the pasta material located in the intermediate region 20 of the central body 12. Non-limiting examples of application methods include writing, mechanical brushing, air brushing, contact printing, image transfer and the like. Contact printing can include, but is not limited to, letter press, lithography, flexography, gravure, screen printing, digital printing including ink jet printing, laser printing, and toner method printing.

Figure 4:
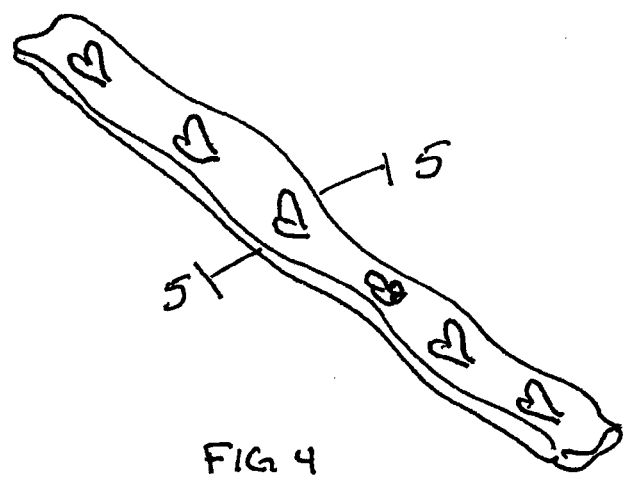
FIG. 4 is a second alternate view of an embodiment of a pasta product as disclosed herein.
Figure 5:
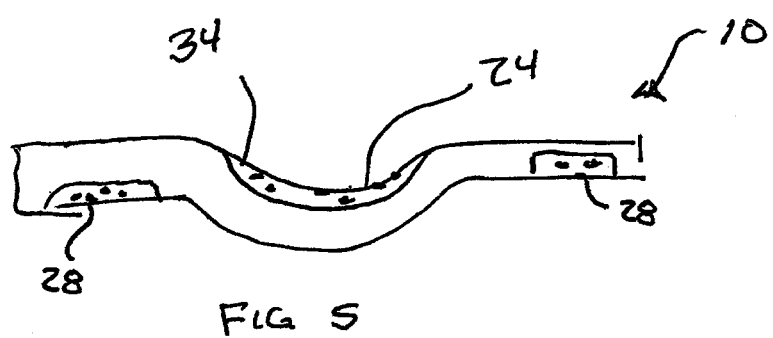
FIG. 5 is a cross-sectional view taken along the 5-5 line of FIG. 4.

First indicia 24' can also include embossed regions such as embossment 34 as is illustrated in the embodiment depicted in FIGS. 4 and 5. The embossment 34 can have any suitable configuration and can be co-perimetric to the printed portion of the first indicia 24'. The embossment 34 can also be offset from the associated printed portion of the first indicia 24' indicia if desired. It is also contemplated that the embossment can be imparted independent of the printed indicia in certain circumstances. The embossment 34 can have any suitable configuration and can either extend above the surface of the pasta product or extend below the surface of the pasta product 10' as desired or required.

The pasta product 10, 10' can be of any suitable size. In various embodiments, the pasta product 10, 10' can be an elongated noodle having a width that is greater than 0.1 inches. In certain various embodiments contemplated in this disclosure, the elongated noodle can be a rectangular object having a width between about 0.25 inches and 2 inches. The elongated noodle can have any suitable length. The embodiment of the pasta product 10 as depicted in FIG. 1 can have a length between about 2 inches and 4 inches where desired or required. The elongated noodle can have any suitable thickness. In various embodiments, the elongated noodle will have a generally uniform thickness that is between about 0.05 inches and 0.25 inches. Where the pasta product 10 is formed in a stacked or folded configuration, it is contemplated that any individual overlying pasta layers will have dimensions as indicated previously. It is also contemplated that in other embodiments, the pasta product 10, 10' can have larger dimensions. For example, the pasta product 10,10' can have dimensions that generally correspond to a pan, dish or other baking object. Thus the pasta product 10,10' as disclosed herein can be a sheet-sized lasagna noodle or noodles with at least one indicia located thereon. The indicia can be of any suitable size. In large lasagna type noodles, the indicia can be picture sized if desired or required. Where desired or required, the pasta product 10,10' can be as large or larger, if desired or required.

The food grade dye material that is used in the first indicia 24 can be any suitable natural or synthetic material that functions as either a pigment, dye or other colorant. It is also contemplated that where desired or required, the food grade material can employ one or more compounds that are classified as dyes. As used herein, the pigment material can be administered in the form of an ink. As used herein, the term "ink" is defined as a liquid or paste that contains pigments or dyes. The ink material employed can optionally also include suitable solvents, resins, lubricants, solubilizers, particulate material, fluorescers and the like. The ink material can be aqueous solutions of materials such as blackberry juice, tumeric spice or the like. The aqueous solution can be prepared by either admixing neat fruit juice with water, by extracting pigment material from the associated spice or food material by boiling, distilling or the like.

Where desired or required, the pasta product 10, 10' can include at least one second indicia 36 that is either the same color as the first indicia 24 or is composed of at least one third color that is different from either the first color of the central body 12 or the first indicia 24. The second indicia can be positioned on either the same display field or can be located on a different location on the central portion. In certain embodiments, the second indicia 34 is located on a region of the central body that is discrete from the display field.

Like the first indicia 24, the second indicia 36 can be formed of a suitable food grade dye or pigment material such as those described previously. Similarly, the second indicia 36 can be applied in the manner previously described as by writing, printing, embossing or combinations thereof.

Figure 3:
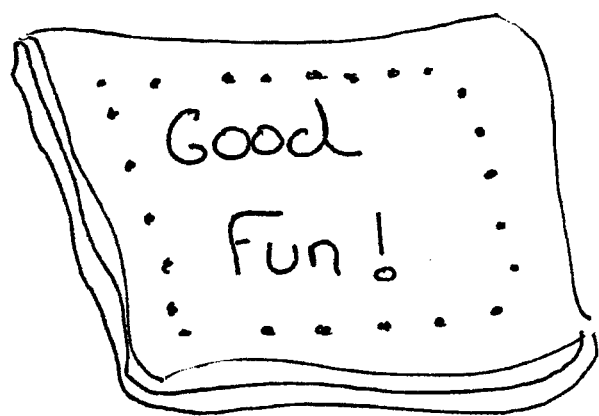
FIG. 3 is a first alternate embodiment of a pasta product as disclosed herein.

The resulting pasta product 10, 10' can be present as at least a single layer product as depicted in FIG. 1. It is also contemplated that the pasta product 10,10' can present as a multiple layer material such as ravioli or the like as depicted in FIG. 3.

The pasta product 10, 10', as disclosed herein can be a product in which the indicia material is essentially permanent during any subsequent cooking process such as boiling, cooking or the like.

The pasta product 10, 10' as disclosed herein can be prepared by a method that comprises the step of contacting at least one design field or display face 16 located on the pasta product 10, 10' with an acidified aqueous solution for an interval sufficient to alter at least one characteristic of the surface region of the pasta product 10,10'. In various embodiments, the contact interval will be for an interval between about 0.5 seconds and about 60 seconds, with contact intervals between about 5 seconds and 30 seconds in certain embodiments of the process disclosed herein. The contact step occurs prior to imparting at least one indicia on the surface of the pasta product 10.

The acidified solution that is employed can include at least one acid such as material selected from the group consisting of at least one carboxylic acid. The acid that is employed will typically be a food grade acid such as those classified by the United Sates Food and Drug Administration as GRAS. Non-limiting examples of suitable carboxylic acids include formic acid, acetic acid, propionic acid, butyric acid. Food grade acids can also include various dicarboxylic acids and tricarboxylic acids including but not limited to citric acid and isocitric acid.

The amount of acid present in the solution can be between 0.5% and 40% by volume. The solution can be present in a gaseous state, a liquid state or a combination of the two. The aqueous solution can be administered at any suitable temperature from ambient to a temperature of about 300° F. In some embodiments, the solution temperature is between 120° F. and 200° F.

The solution contacting step can be accomplished by any suitable method. In certain embodiments, the contacting step can include brushing, spraying, misting and the like. The amount of acidified solution that is applied will be an amount sufficient to integrate into at least a portion of the contact surface such as the design field or display face 16 of the associated pasta product 10, 10'.

The solution contacting step can also include the application of heat to the pasta product 10, 10' either simultaneous to contact with the solution or sequentially after the solution contacting step. When the heating step is employed, the heating step will proceed for an interval sufficient to raise the surface temperature of the pasta product 10,10' without initiating product cooking. The elevation in temperature will be that sufficient to reduce surface moisture and to interact with the material in the pasta product 10,10' to produce a print-ready surface region. In certain embodiments of the process, it is anticipated that the pasta product 10,10' will be heated for at least about 30 seconds in order to activate the pasta surface. It is contemplated that the elevated temperature to which the pasta product 10,10' is exposed will be between about 75° F. and 200° F. in certain applications. However temperatures above this range are also contemplated. It is understood that more elevated temperatures may require reduced exposure times. The upper limit of the heating interval will be below the time required to initiate product cooking. In certain situations the upper limit may be 60 seconds. The heating interval produces an activated pasta surface that is ready to receive print indicia. Once the solution contacting step has been completed, the process may also include an optional drying step in order to remove any excess fluid from the pasta surface to help produce the activated surface that is ready to receive print indicia.

The activated surface will generally have tacky, glue-like surface characteristics. The activated surface will be generally smooth and print-ready without appreciable dimpling. The presence of a tacky or glue-like surface can serve as an indicator that the surface material is activated and is prepared to receive the application of one or more dyes or pigments that make up indicia 24, indicia 28 or indicia 36. If moving air is employed, the heated moving air can have any suitable wind speed or velocity. In certain embodiments, it is contemplated that the wind speed will be between 10 to 100 cfm.

The pasta product that is employed in the process disclosed herein can be either fresh and/or newly made pasta, or it can be dried material that has been rehydrated. As used herein, dried pasta material is defined as pasta material having a moisture content that is 15 percent or less. Typically dried pasta will have a moisture content that is equal to or less than about 12.5%. Fresh pasta, as the term is used herein, is pasta material having a moisture content greater than 15%, with moisture contents between about 18% and 32% being contemplated in certain embodiments.

Without being bound to any theory, it is believed that when the moisture content of fresh pasta falls to a level between 18% and 22%, the pasta material that was previously present in a flexible pliable state transforms from the flexible pliant state to an elastic state. In the flexible pliant state, the central body of the fresh pasta material can deform under the action of external forces without any particular tension forming in side of it and can permanently keep the shape acquired as a result of the pressure exerted. In the elastic state, the central body of the pasta material, when subjected to stress, will deform but tends to recover its shape as soon as the stress stops.

It is contemplated processes that utilize dry pasta will include a rehydration step. The rehydration step can be one which reintroduces water into the body of the pasta material; in particular to the regions proximate to the surface of the pasta material. In various embodiments, the rehydration process can proceed for an interval sufficient to increase the moisture content to a point where the material enters the elastic state. For example, the rehydration step can be accomplished by introducing the dried pasta into a flash bath for an interval greater than about 30 seconds. The flash bath interval will be one that is less than the interval sufficient to fully cook the pasta material. In certain instances, the flash bath interval will be between about 30 seconds and 3 minutes. The solution employed in the flash bath can be composed of pure water or any suitable aqueous solution composed of water and suitable flavoring agent.

Another example of the rehydration step can include the exposure of the pasta product to a steam environment for an interval sufficient to render the pasta flexible and pliant without allowing the pasta product to become mushy, disintegrate or tear.

Once the pasta material is soft and pliant, typically in the elastic state, the pasta material can be positioned on a suitable support surface. Once the pasta material is in a generally flat planar orientation. The pasta material can be re-blocked as needed or formed into the desired shape. Moist or fresh pasta can also be similarly blocked as required. The blocked pasta material in position on the flat surface can have an upwardly or outwardly oriented face that can be damp on the top with no excess water. Any excess water can be removed by blotting with a suitable material.

The desired surface of the rehydrated pasta material can be activated in the manner described previously.

The process as disclosed herein also can include the step of imparting at least one first food grade dye or pigment material having a first color on discrete areas of the prepared surface of the pasta product. The imparting step can include at least one of ink jetting, brushing, stamping and embossing. The food grade dye material can be imparted in any suitable design to produce an imprinted indicia. Where desired or required, the process can also include the step of imparting at least one second food grade dye material on discrete areas of the prepared surface, the second imparting step including at least one of ink jetting brushing, stamping and embossing, wherein the color of the second food grade material differs from the color of the first food grade material and the discrete surface is the same or different from the discrete surface of the first dye material.

Turning to the process diagram depicted in FIG. 6, an embodiment of the process disclosed herein is designated at reference numeral 100. It is to be understood that the process disclosed herein can either batch or continuous as desired or required. In the process 100 as outlined, a suitable pasta material is obtained as at 110. As discussed previously, the suitable pasta material can be either a dried or fresh material containing any suitable flour material. The amount of pasta that is employed in a given batch will be that suitable to produce a given amount of end product.

The moisture content of the obtained pasta can be ascertained as outlined at reference numeral 120. The moisture content can be determined by any suitable measurement or means. It is within the purview of this disclosure that the moisture content determination step can also include obtaining manufacturer specifications regarding moisture content.

If the moisture content of the pasta material is below approximately 15% as at reference numeral 130, the pasta material can be subjected to a rehydration process as at reference numeral 140. Non-limiting examples of a suitable rehydration process can include contacting the pasta material with a heated aqueous material for an interval sufficient to introduce water into the pasta structure. In certain embodiments of the process as disclosed herein the rehydration step can include immersing the pasta material in a boiling water bath for a limited interval which can be between about 30 seconds and about 60 seconds.

When the pasta material has a moisture content above approximately 15%, the pasta material can be exposed to a surface activation step as at reference numeral 150. The surface activation step can proceed for an interval sufficient to achieve what is believed to be a chemical reaction which transforms the surface of the pasta material product in a manner that facilitates uptake of the ink or pigment material employed in the indicia such as indicia 24, 28, 36.

The process 100 can also include a step to ascertain the level of surface activation as at reference numeral 160 as desired or required. If the ascertainment step is employed, if the level of surface activation is insufficient, the exposure step 150 can be repeated or reiterated as desired or required. The process can include a step or steps by which the pasta surface can be determined to be print-ready as at reference numeral 170. Where desired or required, the activated pasta surface can be analyzed to determine activation depth in order to determine that it is a proper depth as at reference numeral 180. If the activation depth is appropriate, the process can proceed. If not, the activation step 150 can be repeated or reiterated. Non-limiting examples of such activation depth include depths between about 10% and 50% of the thickness of the pasta material.

Print-readiness can also include determining whether excess moisture is present on the surface of the pasta material as at reference numeral 190. If there is any excess moisture present in or on the surface of the pasta (reference numeral 200), it can be removed by any suitable method such as blotting or the like.

Once the excess surface moisture is removed, at least one ink/pigment indicia can be introduced to the prepared pasta surface as at reference numeral 210. The ink/pigment can be introduced by any suitable means. Non-limiting examples of such introduction methods can include, brush application, ink jet transfer as well as various ink stamping or printing methods. Examples of printing methods include block printing, press printing, rotary press printing. These are but a few of the methods contemplated.

The printing process employed and its interval is that sufficient to integrate the ink/pigment indicia into the surface of the pasta product as at reference numeral 230. Where required, the printing steps can be repeated using various inks, pigments, designs, etc. Integration, as the term is employed herein, includes association of the ink/pigment material into or onto the pasta material in a permanent or essentially permanent manner. Once the ink or inks have been introduced, the pasta material can be dried to a moisture content below at least 18%.

The resulting material is a shelf stable food product with a printed indicia integrated into the surface of the pasta material. When desired, the resulting pasta material can be cooked in manner such as boiling or the like. The cooking time for the decorated pasta material can be that suitable to make an al dente material. The printed indicia present in the pasta material remains stable during and after the cooking process with little or no blurring of the indicia or appreciable removal of the pigment or ink in the indicia.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for preparing a decorated pasta product, comprising the steps of:
    providing a pasta product having at least one display face, the display face having a display field, an outwardly oriented surface, and an intermediate region located underneath the outwardly oriented surface extending into the interior of the pasta product;
    the pasta product having a moisture content between 18% and 22%;
    prior to imparting at least one indicia onto a surface of the pasta product, contacting the at least one display face with an acidified aqueous solution for an interval of at least between 0.5 seconds to 60 seconds to produce an activated surface having tacky, glue-like characteristics wherein the activated surface extends through between 10% and 50% of the thickness of the pasta product; and,
    imparting at least one indicia onto the at least one display field and into the intermediate region of the central body, the indicia consisting of a food grade dye material, wherein the food grade dye material adheres to the pasta product in the intermediate region.

2. The process of claim 1 wherein the acidified aqueous solution comprises at least one food grade acid selected from the group consisting of food grade carboxylic acids.

3. The process of claim 2 wherein the acidified aqueous solution is present in a gaseous state, a liquid state, or a mixture of the two.

4. The process of claim 1 wherein the acidified aqueous solution is present at a temperature between about 175° F. and 200° F.

5. The process of claim 1 further comprising the step of after the contacting step, drying the pasta product for an interval of at least 5 seconds.

6. The process of claim 5 wherein the drying step comprises contacting the pasta product with air at a temperature between 150° F. and 300° F.

7. The process of claim 6 wherein the drying step includes contacting the pasta product with air at a temperature between 150° F. and 300° F. and a velocity between 10 cfm and 100 cfm.

8. The process of claim 5 further comprising the imparting step at least one first food grade dye material having a first color on discrete areas of the prepared surface of the pasta material, the imparting step including at least one of ink jetting, brushing, stamping, and embossing.

9. The process of claim 8 further comprising the imparting step at least one second food grade dye material on discrete areas of the prepared surface of the pasta material, the second imparting step including at least one of ink jetting brushing, stamping, and embossing, wherein the color of the second food grade dye material differs from the color of the first food grade dye material and the discrete area is the same or different from the discrete area of the first dye material.

10. The process of claim 9 further comprising the step of:
    after at least one of the first or second food grade dye material is imparted on the prepared surface of the pasta material, exposing the pasta material to a drying step for an interval suitable to set the dye material wherein the drying interval is sufficient to produce a pasta material having a moisture content below 18%.

* * * * *